US008516368B2

(12) United States Patent
Homma et al.

(10) Patent No.: US 8,516,368 B2
(45) Date of Patent: Aug. 20, 2013

(54) INFORMATION PROCESSING APPARATUS, INFORMATION PROCESSING METHOD, AND PROGRAM (75) Inventors: Fuminori Homma, Tokyo (JP); Tatsushi Nashida, Kanagawa (JP)

(73) Assignee: Sony Corporation, Tokyo (JP)

(*) Notice: Subject to any disclaimer, the term of this patent is extended or adjusted under 35 U.S.C. 154(b) by 3 days.

(21) Appl. No.: 13/246,291

(22) Filed: Sep. 27, 2011

(65) Prior Publication Data

US 2012/0084646 A1 Apr. 5, 2012

(30) Foreign Application Priority Data

Oct. 4, 2010 (JP) .............................. P2010-224767

(51) Int. Cl.
*G06F 17/00* (2006.01)

(52) U.S. Cl.
USPC ........................................................ 715/273

(58) Field of Classification Search
USPC ........................................................ 715/273
See application file for complete search history.

(56) References Cited

U.S. PATENT DOCUMENTS

| 5,663,748 | A | * | 9/1997 | Huffman et al. | 345/173 |
| 5,696,982 | A | * | 12/1997 | Tanigawa et al. | 715/236 |
| 5,761,485 | A | * | 6/1998 | Munyan | 715/839 |
| 5,801,713 | A | * | 9/1998 | Endo et al. | 345/473 |
| 6,021,306 | A | * | 2/2000 | McTaggart | 434/317 |
| 6,729,543 | B1 | * | 5/2004 | Arons et al. | 235/462.13 |
| 6,741,268 | B1 | * | 5/2004 | Hayakawa | 715/777 |
| 6,819,309 | B1 | * | 11/2004 | Kishi | 345/87 |
| 7,283,129 | B1 | * | 10/2007 | Sawada et al. | 345/204 |
| 7,908,284 | B1 | * | 3/2011 | Mathes et al. | 707/755 |
| 7,912,829 | B1 | * | 3/2011 | Mathes et al. | 707/707 |
| 7,979,785 | B1 | * | 7/2011 | Wang et al. | 715/200 |
| 2004/0039750 | A1 | * | 2/2004 | Anderson et al. | 707/103 R |
| 2004/0148574 | A1 | * | 7/2004 | Ohtani et al. | 715/525 |
| 2005/0081145 | A1 | * | 4/2005 | Schwartzkopf | 715/517 |
| 2005/0198593 | A1 | * | 9/2005 | Keely et al. | 715/863 |
| 2008/0201348 | A1 | * | 8/2008 | Edmonds et al. | 707/101 |
| 2010/0011281 | A1 | * | 1/2010 | Hong et al. | 715/232 |
| 2010/0271645 | A1 | * | 10/2010 | Nakabayashi | 358/1.9 |
| 2011/0197121 | A1 | * | 8/2011 | Kletter | 715/234 |
| 2011/0261030 | A1 | * | 10/2011 | Bullock | 345/204 |
| 2012/0151408 | A1 | * | 6/2012 | Groth et al. | 715/799 |

FOREIGN PATENT DOCUMENTS

JP 2000-353170 12/2000

OTHER PUBLICATIONS

Kindle Fire Users Guide, 2004-2011, Amazon.com Inc, pp. 1-24.*

* cited by examiner

*Primary Examiner* — Laurie Ries
(74) *Attorney, Agent, or Firm* — Sherr & Jiang, PLLC (57) ABSTRACT

An apparatus and method provide logic for processing information. In one implementation, an apparatus includes a receiving unit configured to receive an instruction from a user to access portions of content associated with pages of an electronic document. The apparatus also includes a control unit configured to identify a page of the electronic document currently displayed to the user. The control unit is further configured to generate, in response to the instruction, sequential images corresponding to a transition between the identified page and a successive page, based on at least a position of the identified page within the electronic document.

18 Claims, 10 Drawing Sheets

INFORMATION PROCESSING APPARATUS, INFORMATION PROCESSING METHOD, AND PROGRAM

BACKGROUND

The disclosed exemplary embodiments relate to an information processing apparatus, an information processing method, and a program for displaying a content of an electronic book and the like on a display screen such as a touch panel.

From the past, there is known a terminal apparatus such as an electronic book reader that displays electronic books including characters and figures. Such a terminal apparatus is demanded to enable a user to view electronic books with good operability, and various display methods and GUIs (Graphical User Interfaces) for an electronic book, onto which, for example, an operation carried out when the user views an actual book is reflected, are being developed.

For example, in an electronic book display apparatus disclosed in Japanese Patent Application Laid-open No. 2000-353170, an image based on an actual book is displayed on a display screen when a designated page designated by a user is displayed on the display screen. Specifically, an image that expresses a thickness corresponding to the number of pages from the designated page to the first page and an image that expresses a thickness corresponding to the number of pages from the designated page to the last page are displayed at edges of the designated page. Accordingly, a user can easily grasp a position of the currently-displayed page out of the entire book merely by visually checking the display screen (see, for example, paragraph [0027] and FIG. 5).

SUMMARY

In the electronic book display apparatus discussed above, however, since the images that express the thicknesses of the remaining pages and the like are displayed on the display screen, an area where a content of the electronic book is displayed on the display screen is limited. As a result, there is a fear that, when a display screen having a small area, a display screen having a vertically-long aspect ratio, or the like is used, user operability when a user views an electronic book may be deteriorated.

In view of the circumstances as described above, there is a need for an information processing apparatus, an information processing method, and a program with which an electronic book can be viewed with good operability without a limit to an area where a content of the electronic book is displayed on a display screen.

Consistent with an exemplary embodiment, an information processing apparatus includes a receiving unit configured to receive an instruction from a user to access portions of content associated with pages of an electronic document. A control unit is configured to identify a page of the electronic document currently displayed to the user. The control unit is further configured to generate, in response to the instruction, sequential images corresponding to a transition between the identified page and a successive page, based on at least a position of the identified page within the electronic document.

Consistent with an additional exemplary embodiment, a computer-implemented method for processing information includes receiving an instruction from a user to access portions of content associated with pages of an electronic document. The method includes identifying a page of the electronic document currently displayed to the user. The method generates, in response to the instruction, sequential images corresponding to a transition between the identified page and a successive page, based on at least a position of the identified page within the electronic document Consistent with a further exemplary embodiment, a tangible, non-transitory, computer-readable storage medium stores a program that, when executed by a processor, causes the processor to perform a method for processing information. The method includes receiving an instruction from a user to access portions of content associated with pages of an electronic document. The method includes identifying a page of the electronic document currently displayed to the user. The method generates, in response to the instruction, sequential images corresponding to a transition between the identified page and a successive page, based on at least a position of the identified page within the electronic document As described above, according to the exemplary embodiments described herein, it becomes possible to view an electronic book with good operability without a limit to an area where a content of the electronic book is displayed on a display screen.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an exemplary embodiment will be described with reference to the drawings.

1. Information Processing Apparatus

Figure 1:
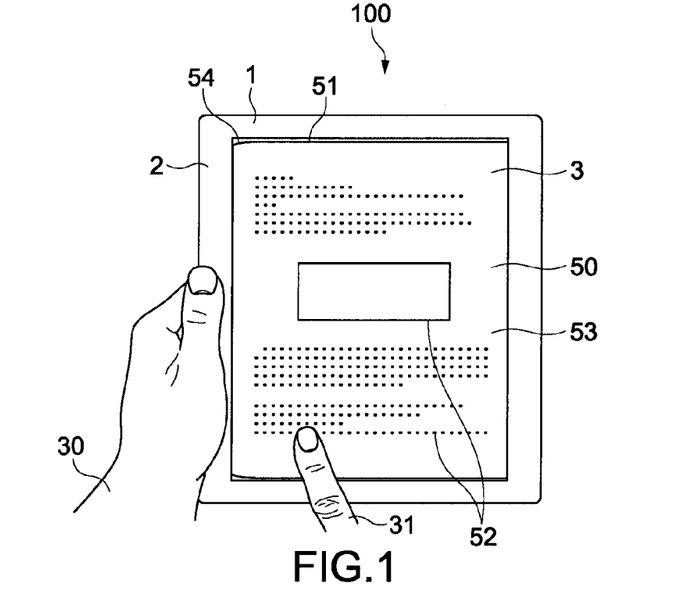
FIG. 1 is a diagram schematically showing an outer appearance of a portable terminal as an information processing apparatus according to an exemplary embodiment.

FIG. 1 is a diagram schematically showing an outer appearance of an information processing apparatus according to an exemplary embodiment. A portable terminal 100 equipped with a touch panel is used as the information processing apparatus of this embodiment. By the portable terminal 100 of this embodiment, an electronic book 50 (that is, an electronic document) becomes viewable.

As shown in FIG. 1, the portable terminal 100 includes a casing 1 that is held by a user 30 and a display screen 3 provided on a front surface 2 of the casing 1. The casing 1 is formed of metal such as aluminum and stainless steel, plastic, or the like. The size of the casing 1 is, considering FIG. 1, that is, when seen from the user 30, about 25 cm in a longitudinal direction, about 20 cm in a lateral direction, about 10 cm in thickness, and the like. However, the material and size of the casing 1 are not limited.

The display screen 3 is provided across the entire front surface 2 of the casing 1. The electronic book 50 is displayed on the display screen 3 so as to enable a content of the electronic book 50 to be viewed.

Figure 2:
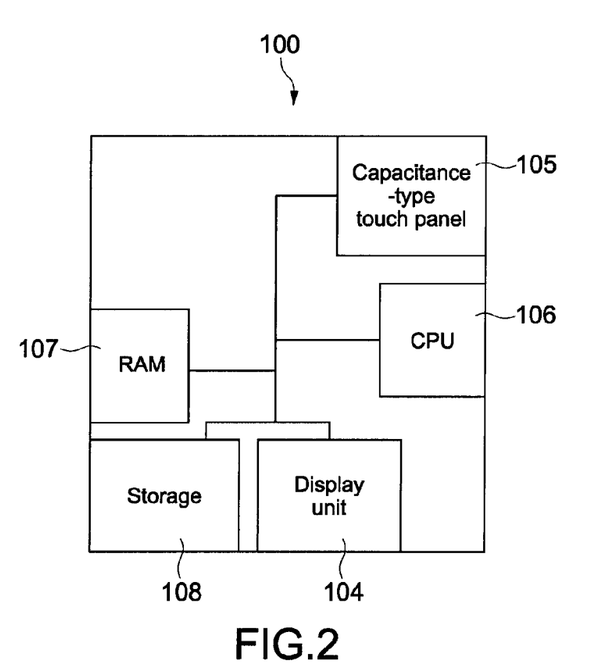
FIG. 2 is a block diagram showing a structural example of the portable terminal shown in FIG. 1.

FIG. 2 is a block diagram showing a structural example of the portable terminal 100. The portable terminal 100 includes a display unit 104 including the display screen 3, a touch panel 105, a CPU (Central Processing Unit) 106, a RAM (Random Access Memory) 107, and a storage 108. For example, the CPU 106, the RAM 107, and an input/output interface (not shown) are connected to one another via a bus or the like. Connected to the input/output interface are the display unit 104, the touch panel 105, and the storage 108.

The display unit 104 is a display device that uses, for example, liquid crystal, EL (Electro-Luminescence), or CRT (Cathode Ray Tube).

The touch panel 105 functions as an input unit that receives various instructions from the user 30. The touch panel 105 includes a sensor unit (not shown) integrally formed with the display screen 3, and an operation circuit unit. When an operator 31 such as a finger of the user 30 comes close to or in contact with the display screen 3, a proximity signal or contact signal is output from the sensor unit to the operation circuit unit. Based on the output proximity signal or contact signal, the operation circuit unit generates information on the proximity position or contact position of the operator 31, information on a movement direction, movement amount, and movement speed of the operator 31, and the like. In addition, information on a contact area of the operator 31 and the like may also be generated. The various types of generated information are output to, for example, the CPU 106 to be subjected to predetermined processing.

In this embodiment, a capacitance-type touch panel 105 is used. However, other types of touch panels such as a resistive film type, a surface acoustic wave type, and an infrared ray type may be used instead.

The storage 108 is a nonvolatile storage device such as an HDD (Hard Disk Drive), a flash memory, and other solid-state memories. A part or all of the RAM 107 and storage 108 corresponds/correspond to a storage means of this embodiment. Alternatively, it is also possible for the portable terminal 100 to include a ROM (Read Only Memory) (not shown) to constitute a storage means including the ROM.

A drive unit and a communication unit (not shown) may be provided in the portable terminal 100. The drive unit is a device capable of driving a removable recording medium such as an optical recording medium, a floppy (registered trademark) disk, a magnetic recording tape, and a flash memory.

The communication unit is a modem, a router, and other communication devices that are capable of connecting with a LAN (Local Area Network) or a WAN (Wide Area Network) and used for communicating with other devices. Communication by the communication unit may either be by wires or wireless.

For example, the electronic book 50 stored in a recording medium is read out by the CPU 106 via the drive unit and displayed on the display screen 3. Alternatively, the electronic book 50 may be downloaded via the communication unit and displayed on the display screen 3.

Data processing by the portable terminal 100 is realized by software stored in the storage 108 and the like in cooperation with hardware resources of the portable terminal 100. Specifically, by the CPU 106 loading a program that is stored in the storage 108 and the like and constitutes software in the RAM 107 and executing it, various types of data processing are realized. In this embodiment, the CPU 106 functions as a controller that outputs a moving image for a page-turn (that is, sequential images corresponding to a transition between a displayed page and a successive page) to be described later and a generation unit that generates the sequential images for the transition. It should be noted that the RAM 107 includes a video RAM (VRAM) for image display (not shown).

Here, an image displayed on the display screen 3 of the portable terminal 100 of this embodiment will be described with reference to FIG. 1. For example, the electronic book 50 read out from the recording medium or downloaded via the communication unit includes a plurality of pages to which page numbers are assigned. Each page includes content data as a content of the page. The content data is, for example, text data and image data. Moreover, the electronic book 50 includes bibliographic data on a title, author, total number of pages, thickness per page, right-bind/left-bind, and the like.

FIG. 1 shows a page image 51 that expresses a shape of a page and content data 52 included in a predetermined page of the electronic book 50. By mapping the content data 52 of a predetermined page to the page image 51, a display page 53 (that is, a page of the electronic document currently displayed to the user) is displayed on the display screen 3. Here, a position of a predetermined page out of all the pages of the electronic book 50 becomes a position of the display page 53 out of all the pages of the electronic book 50. In other words, a display page 53 to which content data of, for example, a fourth page is mapped becomes a display page 53 of a fourth page in the electronic book 50.

In this embodiment, a left-bind left-hand page image 51 is displayed. On a base side of the page image 51 (left-hand side in FIG. 1), a binding portion 54 is displayed. As shown in FIG. 1, the page image 51 is displayed fully in the lateral direction on the display screen 3. The content data 52 is displayed fully in the lateral direction on the page image 51 displayed on the display screen 3.

Figure 3A:
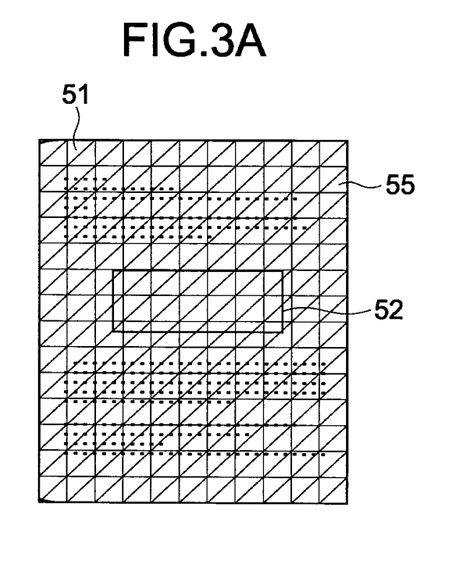
FIGS. 3A and 3B are diagrams for specifically explaining a page image shown in FIG. 1.
Figure 3B:
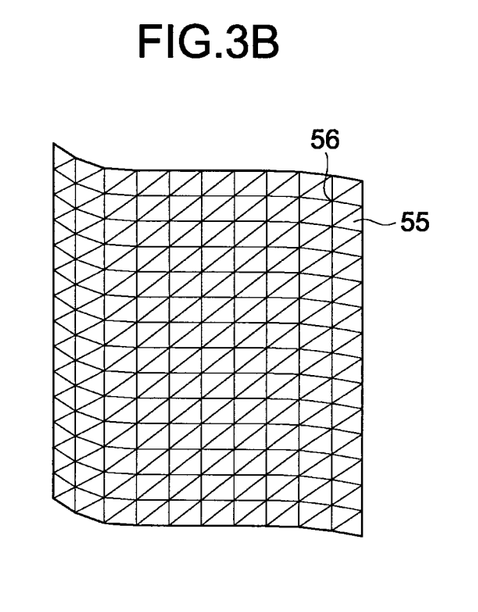
Figure 4:
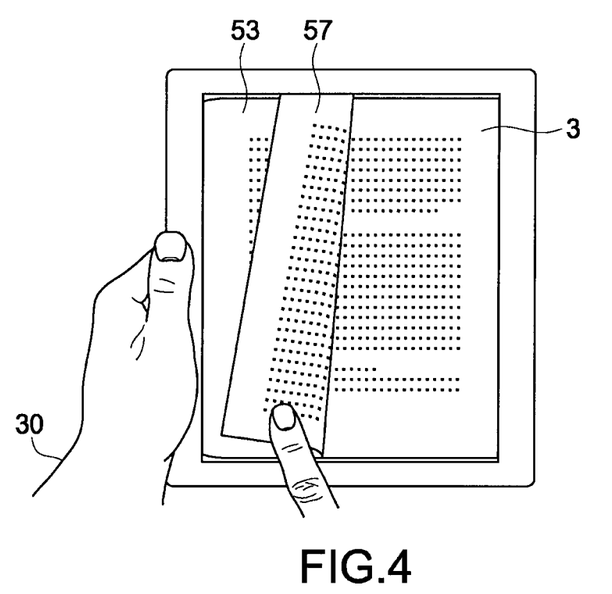
FIG. 4 is a diagram for specifically explaining the page image shown in FIG. 1.

FIGS. 3A, 3B, and 4 are diagrams for specifically explaining the page image 51. As shown in FIG. 3A, the page image 51 of this embodiment is generated as a 3D image constituted of a plurality of polygons 55. The page image 51 is generated as a mesh map constituted of the plurality of polygons 55, and the content data 52 of each of the pages of the electronic book 50 is attached thereto as a texture. As shown in FIG. 3B, by appropriately moving a position of an apex 56 of each polygon 55, it becomes possible to realistically express an operation of, for example, bending an actual paper as an animation or moving image (that is, a sequence of images displayed to the user and corresponding to temporal stages of a page turning operation).

For example, as shown in FIG. 4, it becomes possible to impart a visual effect like turning a page of an actual book to the user 30 at a time an instruction to turn the display page 53 is input by the user 30. Specifically, as shown in FIG. 4, it becomes possible to output a moving image (that is, a plurality of sequential images) for a page turn 57 (that is, a representation of a surface of an identified page) expressing an operation of turning the display page 53 and display it on the display screen 3.

2. Operation of Information Processing Apparatus

An operation of the portable terminal 100 as the information processing apparatus of this embodiment will be described. In the portable terminal 100 of this embodiment, at a time an instruction to turn the display page 53 is input by the user 30 via the touch panel 105, a moving image for a page turn 57 onto which a position of the display page 53 out of all the pages of the electronic book 50 is reflected is generated. The moving image for a page turn 57 is a moving image (animation) onto which the position of the display page is reflected and that expresses a bending degree of the display page 53. The generated moving image for a page turn 57 is output to the display unit 104 and displayed on the display screen 3.

As an operation for inputting an instruction to turn the display page 53, there is, for example, a tap operation with respect to the display page 53, that is, an operation of touch-and-releasing the display page 53. Alternatively, the display page 53 may be turned when a drag operation of dragging a certain distance or more in the lateral or longitudinal direction of the display screen 3 is made with respect to the display page 53. The operation for inputting the instruction to turn the display page 53 can be set as appropriate.

Figure 5:
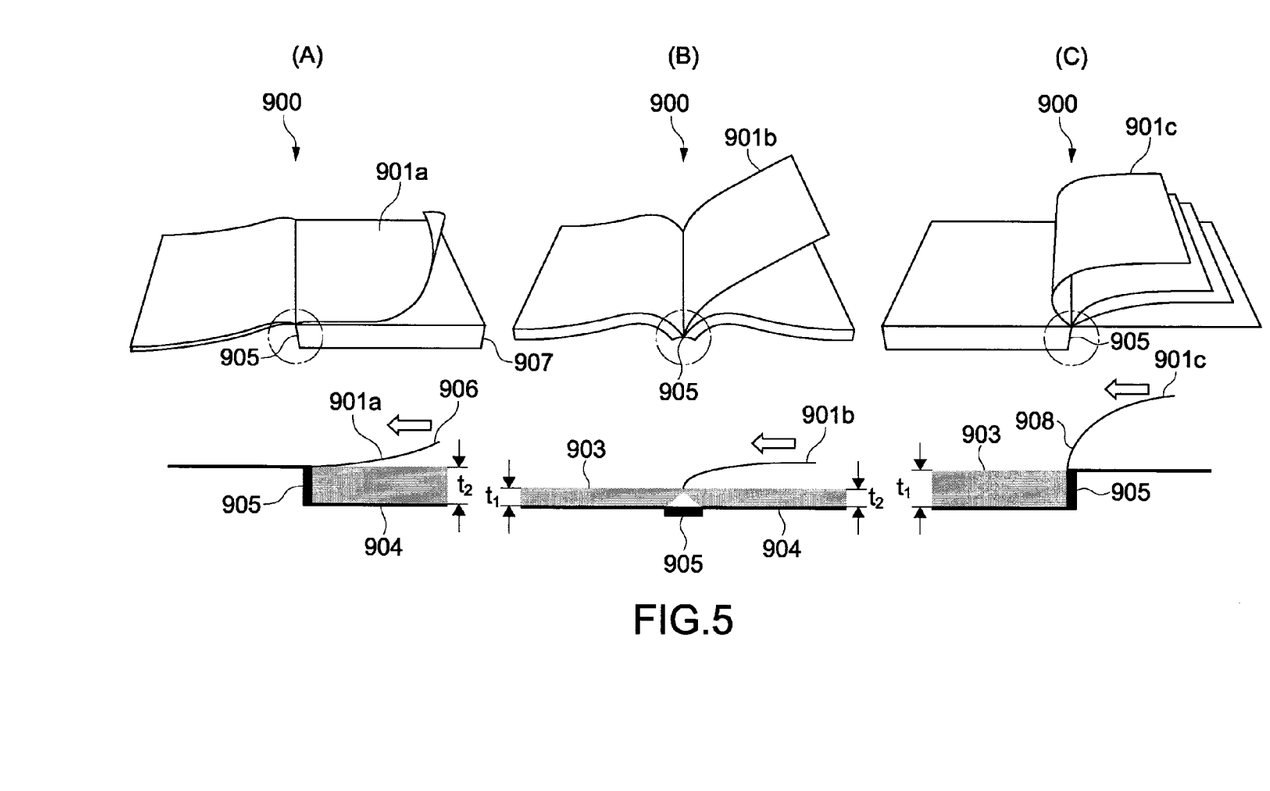
FIG. 5 is a diagram illustrating differences associated with a page-turn operation depending on a position of a page in an actual book.

In descriptions below, generation processing for the moving image for a page turn 57 onto which the position of the display page 53 is reflected will be described. FIG. 5 is a diagram illustrating differences associated with a page-turn operation depending on positions of pages 901*a* to 901*c* in an actual book 900. Part (A) of FIG. 5 is a diagram showing a time the page 901*a* at an early stage of the book 900 is turned, Part (B) of FIG. 5 is a diagram showing a time the page 901*b* at a mid stage of the book 900 is turned, and Part (C) of FIG. 5 is a diagram showing a time the page 901*c* at a final stage of the book 900 is turned.

Comparing Parts (A) to (C) of FIG. 5, a thickness $t_1$ of viewed pages 903 and a thickness $t_2$ of remaining pages 904 differ, and a direction and shape of a back 905 of the book 900 change according to the thickness. Due to such differences and the like, a "bow" that is a shape of each of the pages 901*a* to 901*c* when turned differs depending on the position of the page to be turned.

For example, when the page 901*a* at the early stage shown in Part (A) of FIG. 5 is turned, the page 901*a* is deformed so as to bow with a tip end 906 side of the page 901*a*, that is, an area near an end 907 side of the book 900 being a basis. When the page 901*b* at the mid stage shown in Part (B) of FIG. 5 is turned, a bow does not occur in the page 901*b* at the mid stage. When the page 901*c* at the final stage shown in Part (C) of FIG. 5 is turned, the page 901*c* is deformed so as to bow with a base 908 side of the page 901*c*, that is, an area near the back 905 of the book 900 being a basis.

Further, the speed at which the pages 901*a* to 901*c* are turned were verified. As a result, it was found that the turning speed differs depending on the position of each page. It is presumed that the turning speed is determined based on the paper material of each page, a force that acts on each page from the back 905 at which the pages are bound, and the like. In the verification, it was found that the speeds at which the page 901*a* at the early stage and the page 901*c* at the final stage are turned are higher than the speed at which the page 901*b* at the mid stage is turned.

Figure 6:
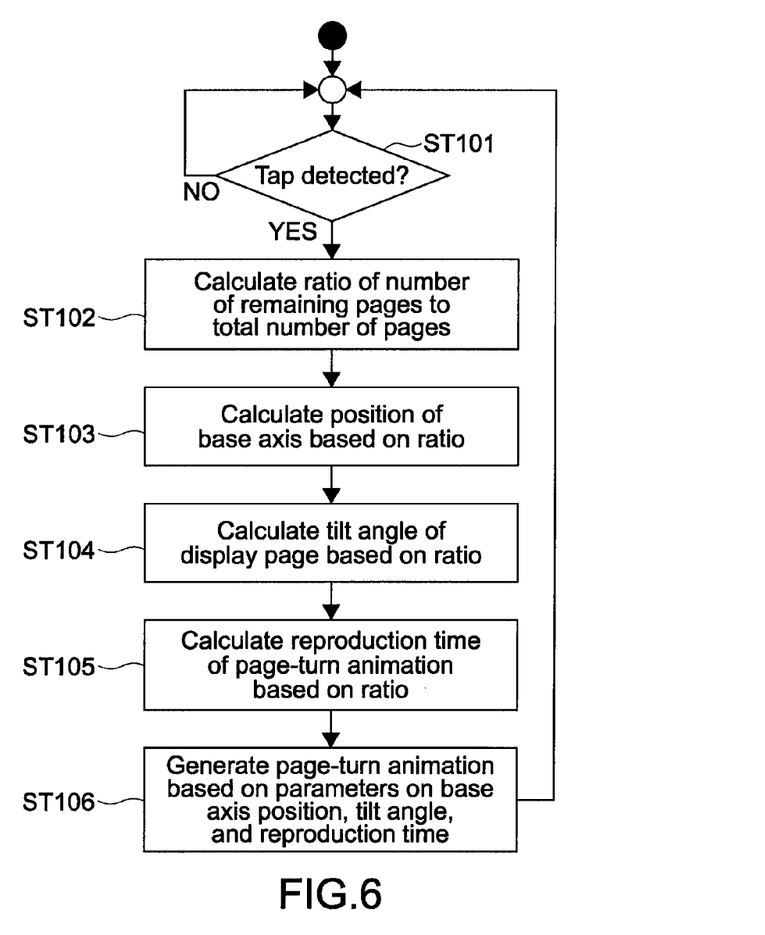
FIG. 6 is a flowchart showing a flow of processing for generating a moving image for a page-turn (page-turn animation)

In this embodiment, based on the verification shown in FIG. 5, the moving image for a page turn 57 onto which the position of the display page 53 is reflected is generated. FIG. 6 is a flowchart showing a flow of processing for generating a moving image for a page-turn (page-turn animation).

First, whether a tap operation is made by the user 30 with respect to the display page 53 is detected (Step 101). When a tap operation is made by the user 30, a ratio of the number of remaining pages to the total number of pages of the electronic book 50 is calculated (Step 102). The ratio of the number of remaining pages is calculated based on the position of the display page 53 out of all the pages of the electronic book 50. Specifically, the ratio of the number of remaining pages is calculated based on data on the total number of pages included in the bibliographic data of the electronic book 50 and the page number assigned to the display page 53.

Based on the calculated ratio of the number of remaining pages, a position of a reference element, for example, a base axis of the moving image for a page turn 57 to be generated is calculated (Step 103). The base axis is an axis that becomes a basis for a bending deformation of the display page 53 to be turned and defined so as to be in parallel with an axis 58 at the base of the page image 51 (see FIG. 7). Moreover, the position of the base axis corresponds to the bending position of the display page 53, that is, the position of the "bow" of the pages 901*a* to 901*c* in the actual book 900 shown in FIG. 5.

FIG. 7 are diagrams schematically showing the generated moving image for a page-turn 57. FIG. 8 is a graph for explaining calculation processing for a position of the base axis.

Figure 7A:
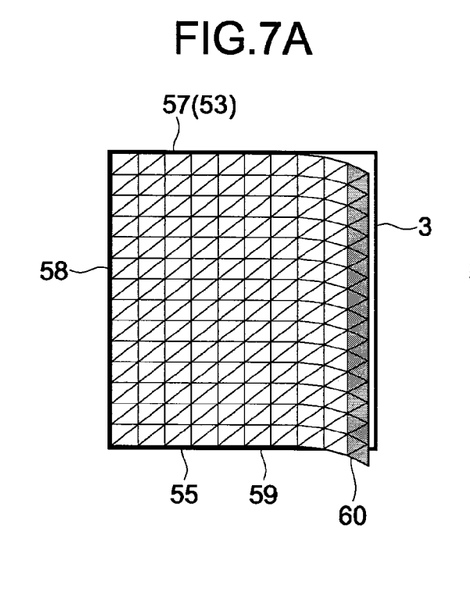
FIGS. 7A, 7B, and 7C are diagrams schematically showing the generated moving image for a page-turn.
Figure 7B:
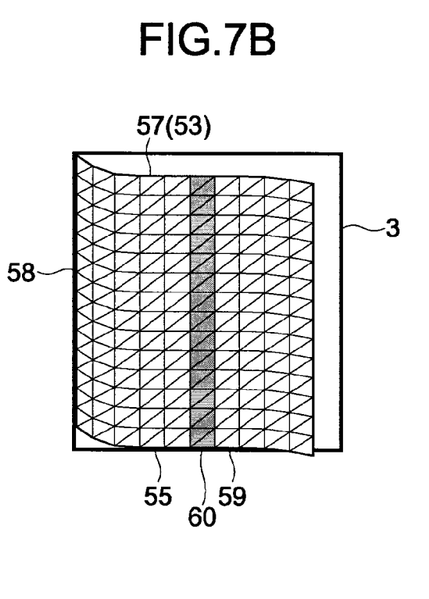

FIG. 7A is a diagram showing the moving image for a page-turn 57 in a case where the ratio of the number of remaining pages is large, that is, the position of the display page 53 to be turned is at an early stage out of all the pages of the electronic book 50. FIG. 7B is a diagram showing the moving image for a page-turn 57 in a case where the position of the display page 53 is at a mid stage, and FIG. 7C is a diagram showing the moving image for a page-turn 57 in a case where the position of the display page 53 is at a final stage.

Figure 7C:
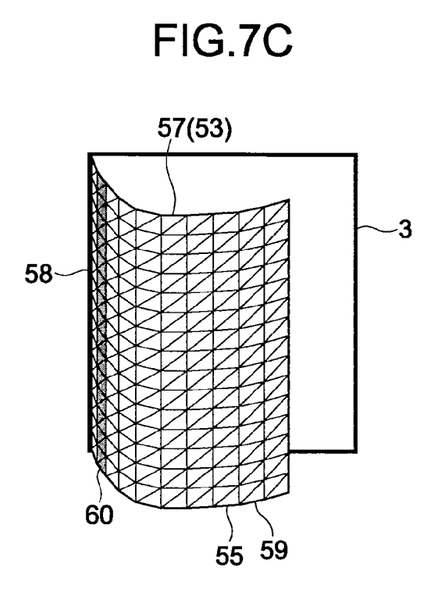
Figure 8:
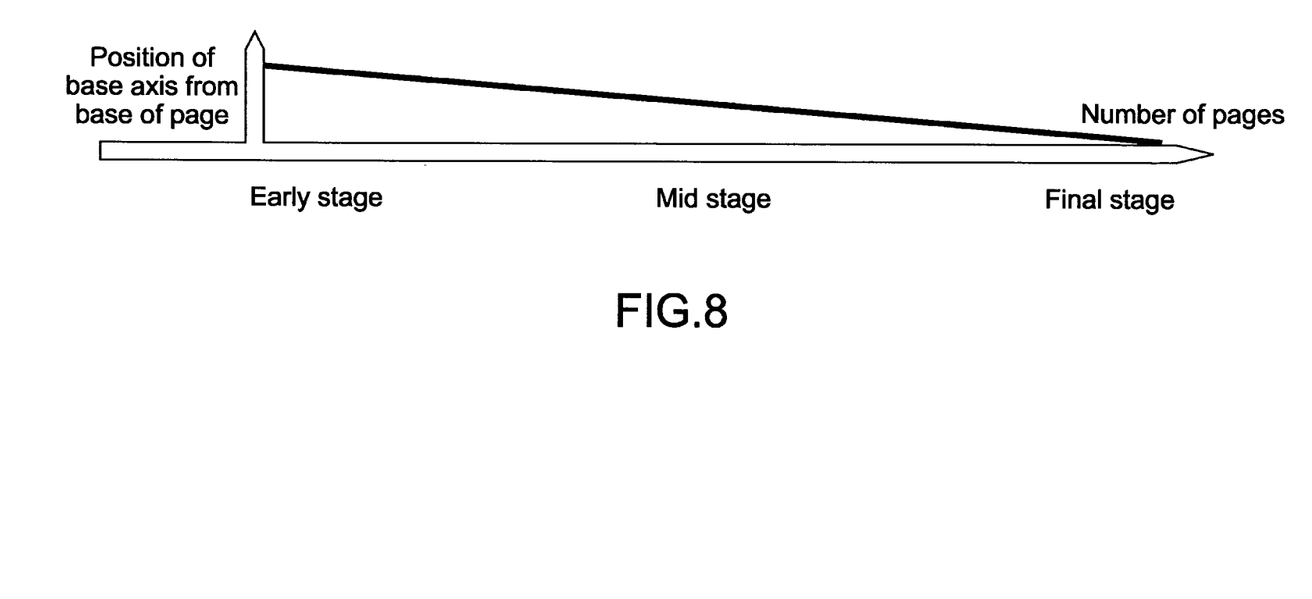
FIG. 8 is a graph for explaining calculation processing for a position of a base axis shown in FIG. 6.

FIGS. 7A to 7C each show set sequences 59 of the polygons 55 that are arranged longitudinally on the display screen 3 out of the plurality of polygons 55 constituting the moving image for a page-turn 57. A set sequence 59 illustrated in a different color out of the set sequences 59 extending longitudinally represents a reference element (that is, a portion of a surface of an identified page) having a base axis 60 (that is, a first axis disposed orthogonal to the surface). In other words, the position of the set sequence 59 corresponding to an intersection of the base axis 60 an a surface of the display page 53 becomes a reference point of the base axis 60 within the reference element.

As shown in FIGS. 7A to 7C, the position of the base axis 60 is set at a tip end side of the display page 53 when the position of the display page 53 is at an early stage. When the position of the display page 53 is at a mid stage, the position of the base axis 60 is set at substantially the center of the display page 53. When the position of the display page 53 is at a final stage, the position of the base axis 60 is set at a base side of the display page 53. Specifically, as shown in the graph of FIG. 8, the position of the base axis 60 is set such that it moves from the tip end side to the base side as the number of remaining pages decreases.

In this embodiment, 10 set sequences 59 constituted of the polygons 55 are arranged in the lateral direction on the display screen 3. The ratio of the number of remaining pages is divided into 10 stages, and the ratio of the number of remaining pages and the set sequences 59 of the polygons 55 are associated with each other. Specifically, when the ratio of the number of remaining pages corresponds to the fourth from the largest (early stage), the fourth set sequence 59 from the tip end of the display page 53 is selected as the base axis 60.

However, the ratio of the number of remaining pages does not need to be divided into stages based on the number of set sequences 59 of the polygons 55. For example, it is also possible to divide the ratio of the number of remaining pages into 3 stages and calculate 3 positions of the base axis 60 shown in FIGS. 7A to 7C so as to respectively correspond to the 3 stages. Moreover, the calculation method for the position of the base axis 60 can be set as appropriate.

The calculation method for the position of the base axis 60 shown in FIGS. 7 and 8 are set based on the position of the "bow" in the actual book 900 shown in FIG. 5.

A tilt angle of the display page 53 with respect to the base axis is calculated based on the ratio of the number of remaining pages (Step 104). The tilt angle of the display page 53 with respect to the base axis 60 corresponds to a bending angle of the display page 53 to be turned and a bow amount and direction of the "bow" in the actual book 900 shown in FIG. 5.

Figure 9A:
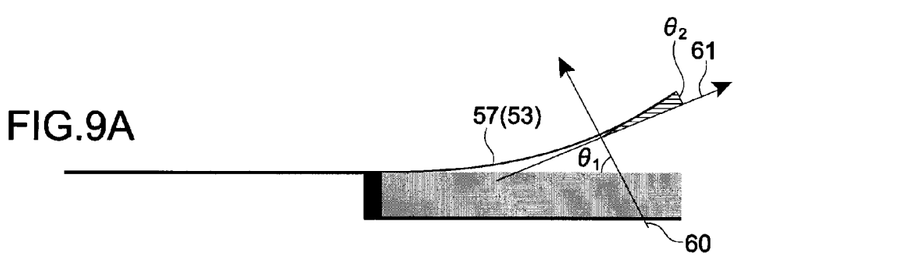
FIGS. 9A and 9B are schematic diagrams for explaining a calculation of a tilt angle of a display page with respect to the base axis shown in FIG. 6.
Figure 9B:
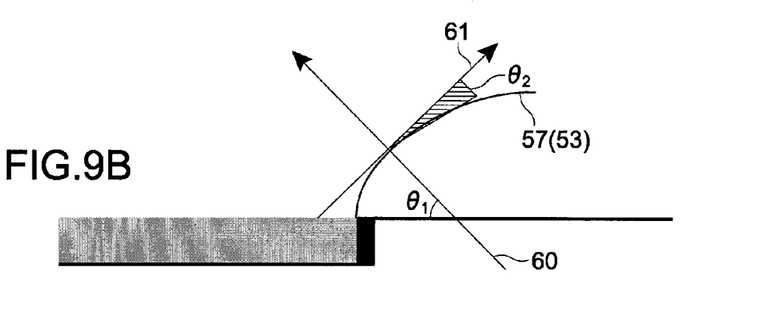
Figure 10:
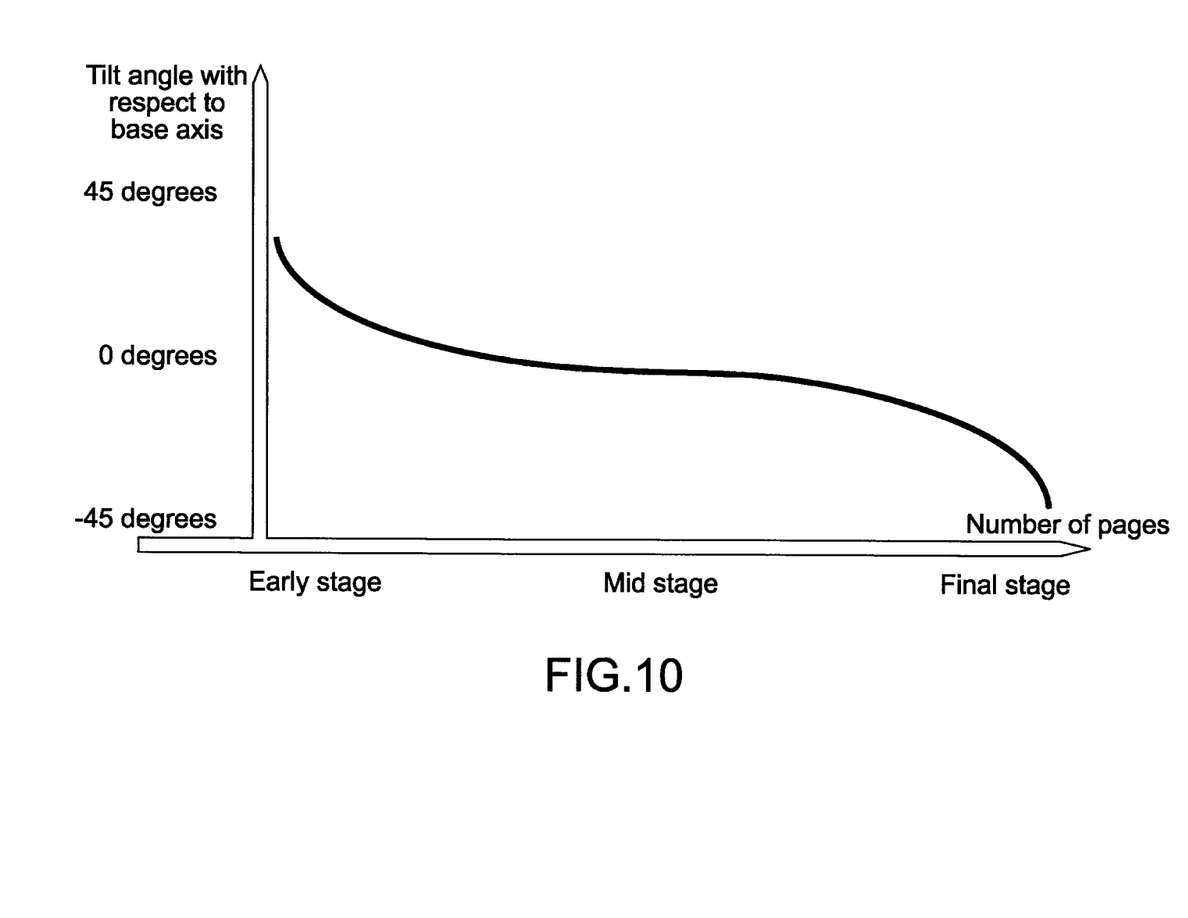
FIG. 10 is a graph for explaining the calculation of a tilt angle of a display page with respect to the base axis shown in FIG. 6.

FIGS. 9A, 9B, and 10 are schematic diagrams and graph for explaining a calculation of a tilt angle of the display page 53 with respect to the base axis 60.

As shown in FIGS. 9A and 9B, an angle $\theta_1$ of the base axis 60 (that is, the first axis) whose position has been calculated in Step 103 with respect to the display screen 3 is set. The angle $\theta_1$ of the base axis 60 may be set in advance based on the position of the base axis 60 or may be calculated as necessary. Once the angle $\theta_1$ of the base axis 60 is calculated, an orthogonal axis 61 orthogonal to the base axis 60 (that is, a second axis) is set. An angle with respect to the orthogonal axis 61 is calculated as a tilt angle $\theta_2$ of the display page 53.

As shown in the graph of FIG. 10, when the position of the display page 53 to be turned is at an early stage, the tilt angle $\theta_2$ of the display page 53 is about 45 degrees. The tilt angle $\theta_2$ of the display page 53 becomes smaller as the position of the display page 53 approaches the final stage. When the position of the display page 53 is at a mid stage, the tilt angle $\theta_2$ is almost 0. The tilt angle $\theta_2$ takes a negative value and eventually becomes about −45 degrees as the position of the display page 53 approaches the final stage. The values used herein are mere examples and are not limited thereto.

In a case where the tilt angle $\theta_2$ takes a positive value, the moving image for a page-turn 57 becomes a moving image in which the display page 53 is deformed to be bent in a concave shape when seen from the user as shown in FIG. 9A. On the other hand, when the tilt angle $\theta_2$ takes a negative value, the moving image for a page-turn 57 becomes a moving image in which the display page 53 is deformed to be bent in a convex shape when seen from the user as shown in FIG. 9B.

In this embodiment, by setting the angle $\theta_1$ of the base axis 60 as appropriate based on the position of the base axis 60, a realistic moving image for a page-turn 57 is generated. However, the angle $\theta_1$ of the base axis 60 may be set to be constant irrespective of the position of the base axis 60. Moreover, it is also possible to set the angle $\theta_1$ of the base axis 60 to be substantially perpendicular to the display screen 3 and set the tilt angle $\theta_2$ of the display page 53 as an angle with respect to the horizontal direction of the display screen 3. As a result, an operation amount can be reduced, and a processing speed can be raised.

In an actual book, the bow becomes smaller as a paper becomes harder, and the bow becomes larger as a paper becomes softer. The tilt angle $\theta_2$ of the display page 53 may be set as appropriate in consideration of the relationship between the hardness of an actual paper and a bow amount.

A reproduction time of the moving image for a page-turn 57 is calculated based on the ratio of the number of remaining pages (Step 105). The reproduction time of the moving image for a page-turn 57 corresponds to the speed at which the display page 53 is turned and is calculated as a parameter representing the speed. The reproduction time becomes shorter as the speed at which the display page 53 is turned increases and becomes longer as the speed at which the display page 53 is turned decreases.

Figure 11:
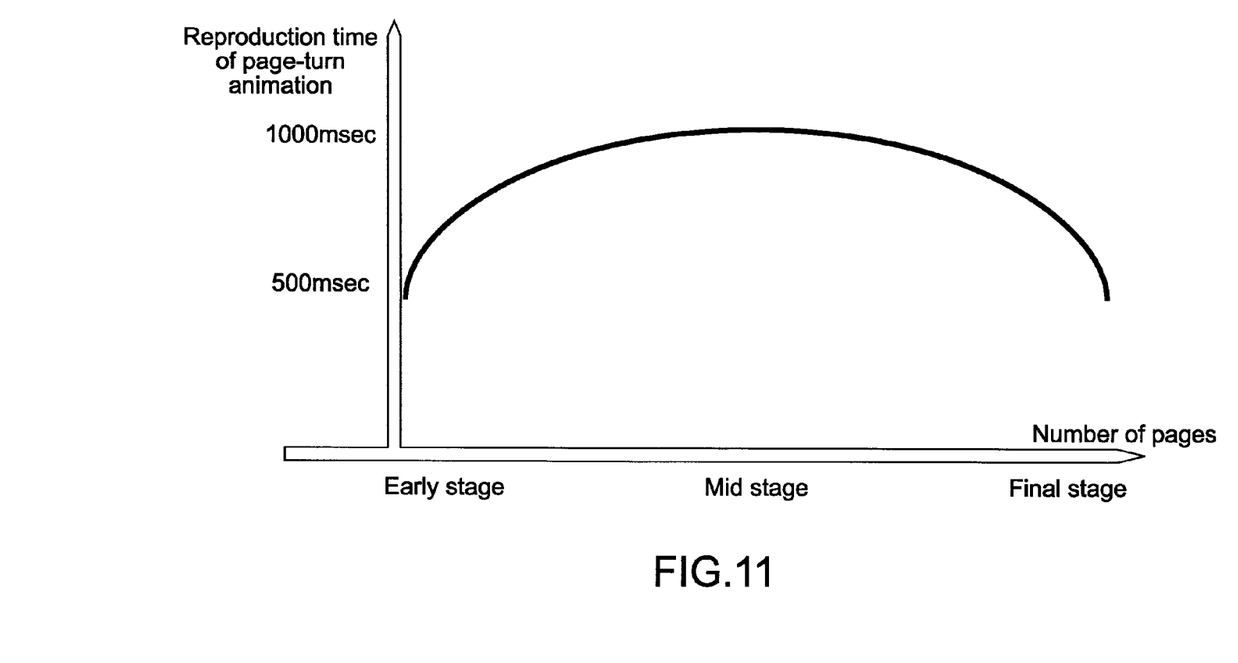
FIG. 11 is a graph for explaining calculation processing for a reproduction time shown in FIG. 6.

FIG. 11 is a graph for explaining calculation processing for the reproduction time according to this embodiment.

As shown in the graph of FIG. 11, in this embodiment, when the position of the display page 53 to be turned is at an early stage, the reproduction time of the moving image for a page-turn 57 is set to be short. The reproduction time of the moving image for a page-turn 57 is set to be longer as the position of the display page 53 approaches a mid stage. In other words, when seen from the user, it seems that the display page 53 positioned at a mid stage is being turned slowly. From the mid stage to a final stage, the reproduction time becomes short and eventually becomes almost the same as the reproduction time at an early stage. As a specific value, as shown in the graph of FIG. 11, the reproduction time at early and final stages is set at 500 msec, and the reproduction time at a mid stage is set at 1000 msec. However, the reproduction times are not limited to those values and can be set as appropriate.

The moving image for a page-turn 57 is generated based on parameters including the position of the base axis 60, the tilt angle $\theta_2$ of the display page 53, and the reproduction time of the moving image for a page-turn 57 (Step 106). The moving image for a page-turn 57 is generated by appropriately moving the positions of the apexes 56 of the plurality of polygons 55 as described above. The generated moving image for a page-turn 57 is output to the display unit 104 and displayed on the display screen 3.

In the portable terminal 100 as the information processing apparatus of this embodiment, when an instruction to turn the display page 53 is input by the user 30 via the touch panel 105, a moving image for a page-turn 57 onto which the position of the display page 53 out of all the pages of the electronic book 50 is reflected is output. Therefore, by visually checking the moving image for a page-turn 57 (page-turn animation), the user 30 can grasp the position of the turned display page 53 or a position of a next page to be displayed in the electronic book 50. Since the moving image for a page-turn 57 is an image that is displayed when the display page 53 is turned, the moving image for a page-turn 57 is not displayed when the content data 52 of the display page 53 is viewed as shown in FIG. 1. Therefore, an area where the content of the electronic book 50 is displayed on the display screen 3 (area on page image 51 in this embodiment) is not limited by the moving image for a page-turn 57. As a result, even when a display screen 3 having a small area or a vertically-long display screen 3 having an aspect ratio of 480*960 (pixel) is used, for example, the user 30 can view the electronic book 50 with good operability like an actual book without content information on the display page 53 being inhibited.

Moreover, in the portable terminal 100, when an instruction to turn the display page 53 is input, the moving image for a page-turn 57 is generated almost in real time. Accordingly, the moving image for a page-turn 57 satisfying the condition on, for example, the total number of pages of the electronic book 50 to be viewed can be generated as appropriate. In the processing of calculating the position of the base axis 60 shown in FIG. 7, for example, if the total number of pages of the electronic book 50 is 1000 pages or more, the position of the base axis 60 is calculated in 15 stages. On the other hand, if the total number of pages of the electronic book 50 is 70 pages or less, the position of the base axis 60 is calculated in 4 stages.

In this embodiment, as the parameters for generating the moving image for a page-turn 57, the position of the base axis 60 as the bending position of the display page 53, the tilt angle $\theta_2$ as the bending angle, and the reproduction time as the speed at which a page is turned have been calculated. Based on the parameters, the moving image for a page-turn 57 onto which the position of the display page 53 is reflected and that expresses the bending degree of the display page 53 and the speed at which the display page 53 is turned has been generated.

However, the moving image for a page-turn 57 may be generated by independently using the parameters or using them in combination. It is also possible to calculate either or both of the position of the base axis 60 and the tilt angle $\theta_2$, for example, and generate the moving image for a page-turn 57 onto which the position of the display page 53 is reflected and that expresses a bending degree of the display page 53. It is also possible to calculate only the speed at which the display page 53 is turned (reproduction time) and generate the moving image for a page-turn 57 that expresses the speed at which the display page 53 is turned.

The parameters for generating the moving image for a page-turn 57 onto which the position of the display page 53 is reflected are not limited to those described above. The moving image for a page-turn 57 onto which the position of the display page 53 is reflected only needs to be generated based on an operation or sound in turning a page, or the like at a time of viewing an actual book.

Other Embodiments

Exemplary embodiments are not limited to those described above, and various other exemplary embodiments are possible.

In the descriptions above, a moving image for a page-turn is generated almost in real time when an instruction to turn a page is input. However, the moving image for a page-turn onto which a position of a page out of all the pages of an electronic book is reflected may be stored in a storage or the like in advance. By the same processing as the generation method described above, for example, a moving image for a page-turn corresponding to a case where a position of a page is at an early stage is generated in advance. Then, a moving image for a page-turn corresponding to a case where a position of a page is at a mid stage is generated in advance. After that, the generated moving images for a page-turn onto each of which the position of the page is reflected are stored in the storage or the like. In this case, the moving images for a page-turn may be generated by an external apparatus.

When an electronic book is viewed by a user, the CPU selects a moving image for a page-turn onto which a position of a page is reflected from the stored moving images for a page-turn. The CPU selects a moving image for a page-turn based on the total number of pages of the electronic book being viewed or the page number of the currently-displayed display page and outputs it to the display unit or the like. For example, content data of the turned display page may be mapped to the selected moving image for a page-turn. By thus storing the moving images for a page-turn in advance, processing for generating moving images for a page-turn becomes unnecessary, with the result that the processing time can be shortened and a load on processing resources can be reduced.

In the calculation processing for a reproduction time shown in FIG. 11, the reproduction time for a moving image for a page-turn becomes longer as the position of the display page moves from the early stage to the mid stage and becomes shorter as the position of the display page moves from the mid stage to the final stage. However, the reproduction time may gradually increase as the position of the display page moves from the early stage to the final stage. In other words, the display page positioned at the final stage may be turned at a slowest speed.

In the descriptions above, a 3D animation image that uses a plurality of polygons has been used as the moving image for a page-turn. However, the moving image for a page-turn is not limited thereto and may be a 2D animation image that uses, for example, an affine transformation.

In the descriptions above, a touch panel has been used as the input unit. However, an instruction to turn a display page may be input by the user using a touch pad provided separate from the display screen, for example. Alternatively, the instruction may be input by the user using, for example, a pointing device such as a mouse. Moreover, an information processing apparatus that outputs a moving image for a page-turn to an external display apparatus that is not equipped with a display screen may be used as the information processing apparatus according to the exemplary embodiment.

FIG. 1 shows the page image 51 at a time the content data 52 of the display page 53 is viewed. The bow of the opened display page 53 may be expressed by the page image 51. In an actual book, for example, the way of opening the page that is being viewed differs among a page at an early stage, a page at a mid stage, and a page at a final stage. Comparing the ways of opening the pages between the page at the early stage and the page at the final stage, a bow is mainly caused more on the base side at the final stage than at the early stage (see FIG. 5). The bow of the opened page is expressed by an image of a shadow mainly on the base side of the display page 53. By setting a gradation of a shadow onto which the position of the display page is reflected as appropriate, the user can grasp the position of the page merely by visually checking the display page. It should be noted that the image of a shadow only needs to be generated with darkness that does not inhibit viewing of the content data 52 of the display page 53.

In the descriptions above, a display page corresponding to one page has been displayed on the display screen. However, display pages corresponding to two pages may be displayed on both sides on the display screen. Also in this case, a moving image for a page-turn onto which positions of display pages to be turned are reflected only needs to be generated. The disclosed exemplary embodiments are also applicable to a page turn in an opposite direction in the case where the display pages are displayed on both sides. In this case, the positions of the display pages to be turned only need to be calculated with the last page of an electronic book as a basis. Specifically, a display page positioned at an early stage with respect to the page turn in the forward direction only needs to be processed as a display page positioned at a final stage with respect to the page turn in the opposite direction.

Even when enlarged content data of a display page is displayed, the moving image for a page-turn only needs to be output based on any or all of the parameters including the bending position, the bending angle, and the turning speed.

The present disclosure contains subject matter related to that disclosed in Japanese Priority Patent Application JP 2010-224767 filed in the Japan Patent Office on Oct. 4, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a receiving unit configured to receive an instruction from a user to access portions of content associated with pages of an electronic document; and
a control unit configured to:
identify a page of the electronic document currently displayed to the user;
generate, in response to the instruction, sequential images corresponding to a transition between the identified page and a successive page, based on at least a position of the identified page within the electronic document,
based on the position of the identified page within the electronic document, determine a number of subsequent pages contained in the electronic document after the identified page;
compute a ratio of the number of subsequent pages to a total number of pages of the electronic document; and
generate representations of a surface of the identified page, based on at least the computed ratio.

2. The information processing apparatus of claim 1, wherein the image processing apparatus further comprises a display unit configured to display an image of the identified page to the user, in response the first signal.

3. The information processing apparatus of claim 2, wherein:
the control unit is further configured to generate successive signals to display corresponding ones of the sequential images; and
the display unit is further configured to display the corresponding ones of the sequential images to the user, in response to the successive signals.

4. The information processing apparatus of claim 3, wherein the sequential images represent an animation of the transition from the identified page to the successive page.

5. The information processing apparatus of claim 1, wherein the transition between the identified page and the successive page corresponds to a page turning operation.

6. The information processing apparatus of claim 5, wherein the representations of the surface of the identified page are associated with shapes of the surface at corresponding stages of the page turning operation.

7. The information processing unit of claim 1, wherein the control unit is further configured to obtain bibliographic data associated with the electronic document, the bibliographic data identifying the total number of pages within the electronic document.

8. The information processing apparatus of claim 1, wherein the control unit is further configured to identify a portion of the surface as a reference element, based on at least the computed ratio.

9. The information processing apparatus of claim 8, wherein the control unit is further configured to:
partition the surface into a plurality of elongated elements; and
select one of the elongated elements as the reference element, based on the computed ratio.

10. The information processing apparatus of claim 8, wherein the control unit is further configured to:
compute positions associated with the reference element within the surface, the positions being associated with respect to corresponding stages of the page turning operation; and
generate the representations of the surface, based on at least the reference element positions.

11. The information processing apparatus of claim 10, wherein the control unit is further configured to:
calculate, based on at least the computed ratio, tilt angles for the reference element disposed at the corresponding reference element positions; and
generate the representations of the surface, based on at least the reference element positions and the tilt angles.

12. The information processing apparatus of claim 11, wherein the control unit is further configured to establish first and second orthogonal axes associated with the reference element, the first axis being normal to the surface at a reference point, and the second axis being tangential to the surface at the reference point.

13. The information processing apparatus of claim 12, wherein the tilt angles correspond to angles between the second axis and the surface at the reference point.

14. The information processing apparatus of claim 11, wherein the control unit is further configured to:
compute speeds associated with the corresponding states of the page turning operation, the speed being representative of a speed at which the identified page is turned during the states of the page turning operation; and
generate the representations of the surface, based on at least the reference element positions, the tilt angles of the reference element, and the computed speeds.

15. The information processing device of claim 1, further comprising a sensor unit coupled to the receiving unit and configured to generate a signal indicative of a contact between an operational tool of the user and a surface of the sensor unit.

16. The information processing device of claim 15, wherein the operational tool comprises a human appendage.

17. A method for processing information, comprising:
receiving an instruction from a user to access portions of content associated with pages of an electronic document;
identifying a page of the electronic document currently displayed to the user;
generating, in response to the instruction, sequential images corresponding to a transition between the identified page and a successive page, based on at least a position of the identified page within the electronic document;
based on the position of the identified page within the electronic document, determining a number of subsequent pages contained in the electronic document after the identified page;
computing a ratio of the number of subsequent pages to a total number of pages of the electronic document; and
generating representations of a surface of the identified page, based on at least the computed ratio.

18. A tangible, non-transitory, computer-readable storage medium storing a program that, when executed by a processor, causes the processor to perform a method for processing information, comprising:
receiving an instruction from a user to access portions of content associated with pages of an electronic document;
identifying a page of the electronic document currently displayed to the user;

generating, in response to the instruction, sequential images corresponding to a transition between the identified page and a successive page, based on at least a position of the identified page within the electronic document;

based on the position of the identified page within the electronic document, determining a number of subsequent pages contained in the electronic document after the identified page;

computing a ratio of the number of subsequent pages to a total number of pages of the electronic document; and generating representations of a surface of the identified page, based on at least the computed ratio.

* * * * *